United States Patent [19]

Reil et al.

[11] 4,034,537

[45] July 12, 1977

[54] METHOD AND APPARATUS FOR THE CONTINUOUS MANUFACTURE OF PACKAGES FOR LIQUIDS

[75] Inventors: Wilhelm Reil, Bensheim-Auerbach; Jörg Trabitzsch, Seeheim, both of Germany

[73] Assignee: Altstadter Verpackungs-Vertriebs GmbH, Hessen, Germany

[21] Appl. No.: 616,414

[22] Filed: Sept. 24, 1975

Related U.S. Application Data

[63] Continuation of Ser. No. 489,838, July 18, 1974, abandoned.

[30] Foreign Application Priority Data

July 26, 1973  Germany .......................... 2337939

[51] Int. Cl.² .......................................... B65B 9/08
[52] U.S. Cl. .................................. 53/28; 53/180 R
[58] Field of Search ................................ 53/28, 180

[56] References Cited

U.S. PATENT DOCUMENTS

3,320,718  5/1967  Thesing .............................. 53/180
3,498,019  3/1970  Rait ..................................... 53/28

*Primary Examiner*—Travis S. McGehee
*Attorney, Agent, or Firm*—Paul F. Prestia

[57] ABSTRACT

A method of and apparatus for continuously making liquid filled packages wherein a tube is formed from a web, and, having been filled with liquid, is passed round a first turntable to be pre-shaped into packages and to shape first side walls of the packages. The tube is transversely sealed an cut on the first turntable and then passed round a second turntable to shape second, opposite, side walls of the packages.

19 Claims, 7 Drawing Figures

METHOD AND APPARATUS FOR THE CONTINUOUS MANUFACTURE OF PACKAGES FOR LIQUIDS

This is a continuation, of application Ser. No. 489,838 filed July 18, 1974, now abandoned.

This invention relates to a method of and apparatus for the continuous manufacture of liquid-filled packages. In particular the invention relates to a method wherein a web of packaging material is folded over and welded into a continuous tube which has fold lines necessary for the individual package and wherein a lower part of the tube is filled with the liquid. The apparatus of the invention has a longitudinal welding station for forming a tube from the web, a filler pipe disposed above the longitudinal welding station and extending into a lower part of the tube, a transverse welding station and cutting apparatus for cutting off the individual packages.

Numerous machines and methods of these types are known, and have been referred to as providing "continuous manufacture" although they require an at least partially intermittent drive. The intermittent movement is neccessary because the shaping, transverse welding and separation of the individual packages from the tube must be undertaken in separate parts of the apparatus, which is stationary at such times for reasons of convenience.

Obviously, any apparatus with intermittently controlled operations has disadvantages in terms of diminished speed, increased acceleration, large forces of inertia and thus also increased friction and wear.

The object of the invention therefore is to provide a method of and an apparatus for making liquid filled packages wherein the movement of the tube and formed packages is continuous.

According to one aspect of the present invention, there is provided a method of making liquid filled packages wherein a web of material which is impervious to liquid on at least one side is folded and longitudinally welded to form a continuous tube having fold lines necessary for forming the packages, and the tube is filled with the liquid, including the steps of passing the filled tube continuously through a first part circular path while pre-shaping the tube into longitudinally joined individual packages and shaping first side walls of the packages, the first side wall being on the radially inner side of the tube, transversely welding the tube and separating the tube into individual pre-shaped packages as the tube moves in the first part circular path and passing the packages through a second part-circular path of opposite curvature to the first path, the pre-shaped packages being folded and shaped to define second side walls opposite to said first side walls while passing through said second path.

Preferably, said first and second side walls are the narrower of four side walls of the packages. This method permits of really continuous operation, so that the output of packages can be considerably increased. The web of material which is suitably coated with plastics substance, preferably polyethylene, is folded over along its center line in such a way that two superimposed webs of material result. These are connected to each other along one edge via the fold line, and their free ends are connected along the other edge, at a longitudinal welding station. Upstream of the longitudinal welding station is a filling apparatus having a filler tube which extends into the more or less obliquely downwardly extending tube. Thus when the tube is formed, but before the packages are shaped, let along separated into single units, it is filled with liquid.

What is basically novel in this invention lies in the shaping of the packagings in a line which follows a curved path, the packagings being disposed on edge as they are guided along this curved line. Preferably, broader side walls of the package, which will generally at this stage be parallelepipedonal are disposed at front and rear, roughly parallel to the plane of rotation, while narrower side walls extend on the outside and inside of the curve of the tube. It will be evident that the outer radius of curvature is greater than the inner, so that the edgewise disposed packages are stretched outwardly. At this stage there is no reduction in the length of the radially outer part of the tube, although the inner side walls, disposed on a smaller radius of curvature, are partially creased leading to a reduction from the original length of the inner side of the tube. During this time, transverse welding and separation of the individual packagings from one another takes place. Preferably, the transverse welding station is moved together with the packages and preferably there are a plurality of transverse welding stations. It is important that the transverse welding takes place during the rotatory movement. After the packages have been cut into separate units, they pass from the first part circular path to a second circular path of smaller radius of curvature and in which the direction of rotation is reversed. At this stage, the folding of the formerly outer side walls is effected, so that after they have passed through both part circular paths, the packages are sufficiently shaped that it remains only to apply pressure against the protruding tongues and to glue them onto the package.

According to a preferred feature of the invention, the packages are then continuously passed between rotating pressure rollers for final shaping. These rollers can provide for the folding-over of the tongues and, where applicable, the gluing or sealing of the tongues to the tops of the packages.

It is advantageous if the continuous welding of the folded-over web of material is by butt welding of the free edges of the material, using a plastics material which is applied in liquid form. This method has considerable advantages because it eliminates any overlapping of the edges of the web of material along the weld, which would result in a thick strip. There is thus not only a saving on material, but the transverse welding operation is also considerably facilitated and improved. If there was such a thickened strip, the transverse weld means which may be disposed on the bottoms and tops of the packages would be difficult to seal, because the transverse weld seam would have to extend over regions which have two layers of material and also over regions with four layers of material, because at those places where the longitudinal weld seam is produced, gathering or folding over leads to there being four superimposed layers of material. It will be evident that during transverse welding, particularly at the points of transition between zones with two layers of material and zones with four layers of material, it is difficult to produce a perfect seal. Satisfactory and regular heating and even welding often cannot be achieved because it is difficult for the welding jaws to apply pressure to such transition points. With this preferred feature of the invention, this difficulty is surprisingly avoided so that a welded joint of high tensile strength and absolute sealing-tightness is produced because the liquid synthetic plastics material introduced during the butt welding process automatically spreads somewhat over the marginal zones of the web.

By reason of the continuous transverse welding process of the invention, which is performed on the butt welding principle, a welding time of 3 seconds, as experiments have shown, is adequate for a throughput of 10,000 packages per hour.

An important feature of the method of the invention resides in the accurate adjustment of the curvature, i.e., the angle at which the web of material, which may be cardboard or paper, can be pulled off in a constant direction and at an even speed.

In another aspect the invention provides apparatus for making liquid filled packages, including a welding station for longitudinally welding the edges of a folded web of material to form a tube, a filler pipe to extend into a lower part of the tube, a continuously rotatable first turntable, cyclically controlled grippers rotatable with the first turntable to grip the tube at intervals along its length to pre-shape the tube into longitudinally joined individual packages and to shape the tube to define first, radially inward, side walls of the packages, means for transversely welding the tube and separating the tube into individual pre-shaped packages as the tube rotates with the first turntable, and a second turntable continuously rotatable in the opposite sense from the first turntable, the second turntable being adjacent the first turntable to receive pre-shaped packages in a continuous curved path therefrom and to fold and shape the packages to define second side walls opposite said first side walls.

There may be direction-changing rollers for the web of carrier material. The filler pipe will be disposed above the longitudinal welding station and extend into a lower part of the tube. By a "turntable" is meant a rotary assembly which preferably rotates in a vertical plane. Thus the term "turntable" embraces an assembly of grippers or, as the case may be, shaping dics or other surfaces rotating round an axis which is preferably horizontal.

It is expedient for the direction of movement of the tube on the first turntable to have a component in the direction of the force of gravity, so that the liquid filling the tube can be kept at a predetermined level in the lower part of the tube without any special measures being adopted. New in principle is the idea of guiding the tube, and the longitudinally connected adjacently disposed packages around the periphery of the first turntable so that during the rotary movement, shaping, transverse welding and separation can be effected continuously without interrupting the filling process and the constant movement. The disposition of the second turntable near the first represents a reversal of the shaping principle, in that only the initially inner side walls can be shaped on the first turntable accompanied by a shortening of the length of the inner side of the tube, while on the second turntable, though with simpler means i.e., without gripper devices, shaping of the oppositely disposed and initially outer side faces of the package can be performed. It will be understood that any other working operations such as the pressing down of the protruding tongues, the welding thereof onto the upper and lower faces of the package, and possibly the counting and discharging arrangements, may be adapted to the continuous operating cycle. This means that pressure-applying jaws for final shaping can also jointly rotate and a conveyor belt, counting devices and the like can move at the same speed so that there are no accumulations or delays in carrying away the individual, completely shaped packages.

It is preferred for the tube to run tangentially onto the first turntable, the longitudinally connected packages being designed to run off this turntable after rotating through approximately 250° and there being as many transverse welding stations as there are gripper devices, with the welding operation of the transverse welding stations taking place after approximately half the 250° travel. In a particular embodiment of the invention, there are eighteen gripper devices and eighteen transverse welding stations. The associated expenditure on mechanical equipment is nevertheless economical because the machine according to the invention has an unexpectedly high rate of output.

In a particular embodiment, the transverse welding stations have cam-operated sealing jaws and include the cutting apparatus. In this way, a compact construction is possible, and the control systems which are preferably operated by cam plates for controlling the cutters and the sealing jaws, can be mechanically coupled with one another easily and in a small space.

The axis of rotation of the first turntable is preferably parallel to that of the second turntable and at right-angles to the direction of movement of the tube. In this case, in a particular embodiment the projection of the direction of movement of the tube with respect to the horizontal may be compared with the axial directions. These measures lead to a further simplification of the apparatus because there is a saving on direction-changing rollers and because there are no changes in speed during withdrawal of the packages or of the tube.

In one particular embodiment the gripper devices are controlled by a fixed cam plate on the axis of rotation of the first turntable, the control face of the cam plate being followed by radially movable push members which carry the gripper devices on their outer ends. This type of control provides for rugged construction.

In one form, each gripper device has, rotatably mounted on a push member, a member of U-shaped cross-section. The web of the U-shaped member is longer than the arms and of a length equal to the height of the finished packages. In use, the webs engage the inner line of curvature of the tube or chain of packages which extends in a circle around the first turntable and the webs contribute to the shaping of the tube on the fold lines provided in the tube material. There is no need for the U-shaped members to be particularly controlled because, during the rotary movement, they bear automatically against the inner side walls of the packages. With regard to the length of the web, it may be mentioned that in comparison with the height of the completed and folded package, there is obviously a slight tolerance, i.e., the length of the web of the member is shorter than the height of the completed and folded packages by a small amount, for example twice to six times the thickness of the web of material.

In another form, the gripper device has positively controlled gripper jaws hinged to rotate on push members. The gripper jaws, at the place where the tube contacts the first turntable, grip the tube at the points of connection of the adjacently disposed packages and thus produce folds along the prepared fold lines. The positive control of such gripper jaws may likewise be mechanically coupled with the radial movement of the members.

In order to complete final shaping, the second turntable may have shaping dies fixed to it and distributed regularly over its periphery which is polygonal. The length of the dies, in the direction of rotation, is equal to the length of the webs of the U-shaped members or the height of packages. It will be apparent that the second turntable is of simpler construction than the first in that it has no gripper devices or arms. The gripper devices on the first turntable so press the individual packages onto the second turntable and the shaping dies thereon that trouble-free shaping is effected on the originally outer side walls of the packages.

Advantageously, the longitudinal welding station, which is preferably a butt welding station, has two oppositely driven cooled rollers having parallel axes of rotation, between which pass the free ends of the material web. The station may have an extruder with a filling tank and filler pipe of such a type that the exit orifice of the extruder is, in the direction of movement of the web immediately upstream of the rollers. As a result of this compact construction of the welding station, a single source of heat to liquefy a plastics granulate, produces the welding seam which, immediately it is made, is shaped and cooled by the rollers. In this way it is possible for the tube to be so firm very shortly downstream of the welding station that it can be filled with the liquid which it is to contain. In this respect, it is practical for the rollers to be constructed as hollow rollers, their interiors being provided with inlet and supply means for cooling liquid. It is expedient for the arrangement for folding the web into a tube to be so provided that the tube passes over one roller as it passes the welding station.

In order that the invention may be more clearly understood the following description is given, merely by way of example, with reference to the accompanying drawings, in which.

Figure 1:
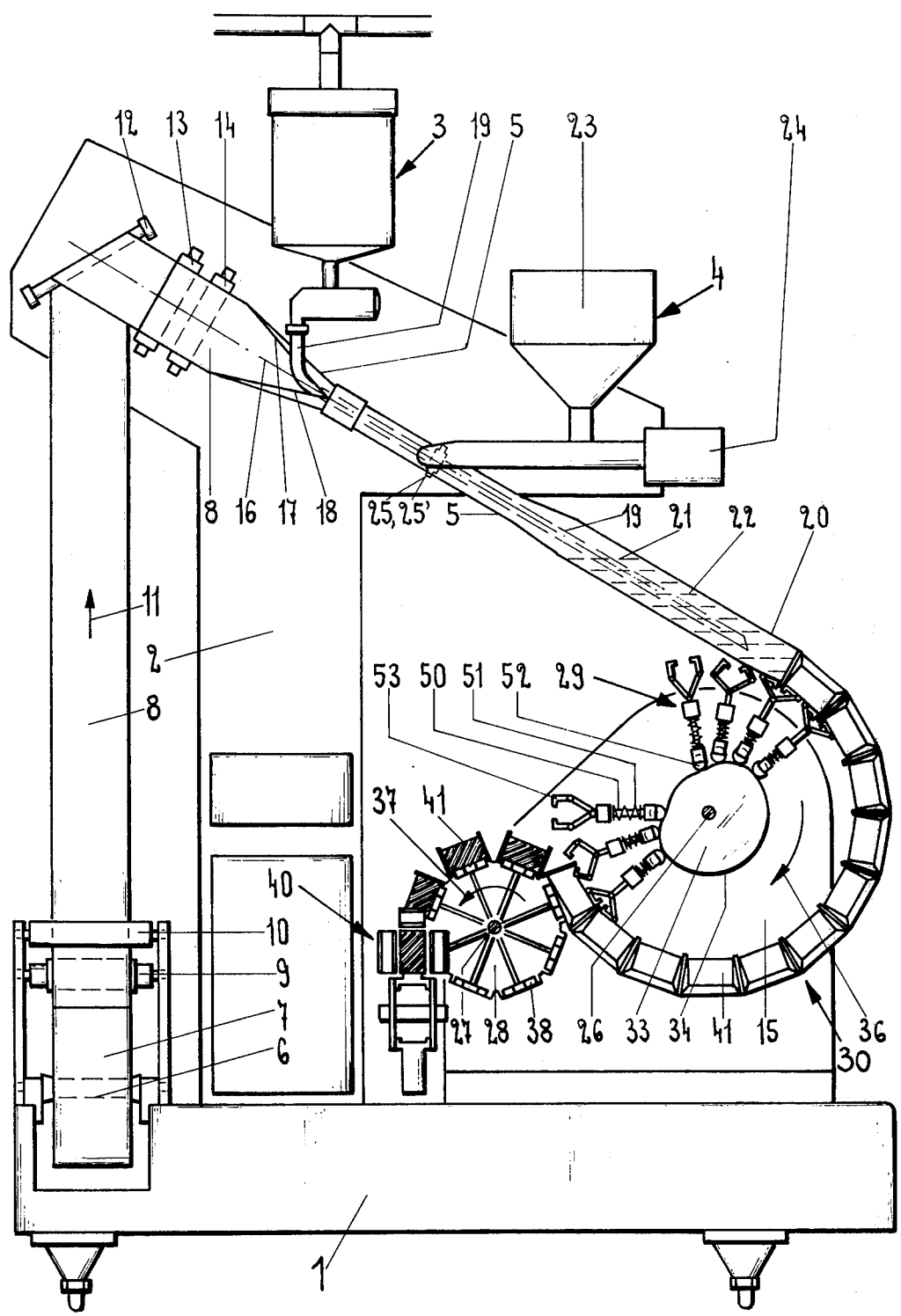
FIG. 1 is a diagrammatic side view showing the overall construction of one form of apparatus according to the invention.
Figure 4:
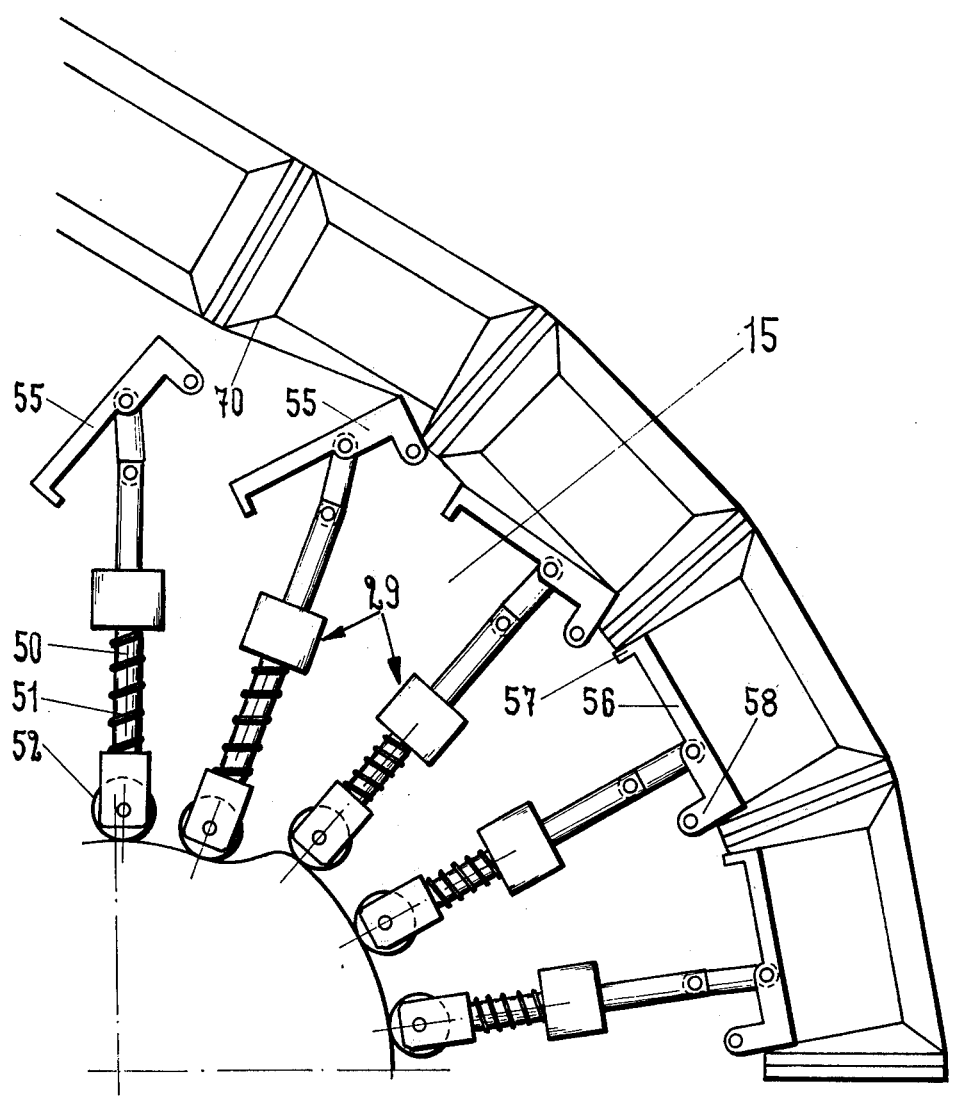
FIG. 4 shows an enlarged diagrammatic side view of an alternative embodiment of the gripper device.
Figure 6:
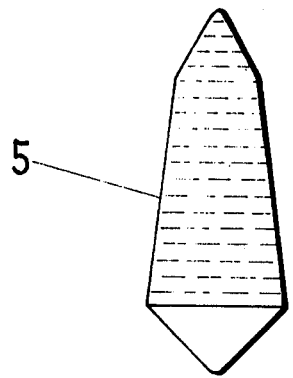
Figure 7:
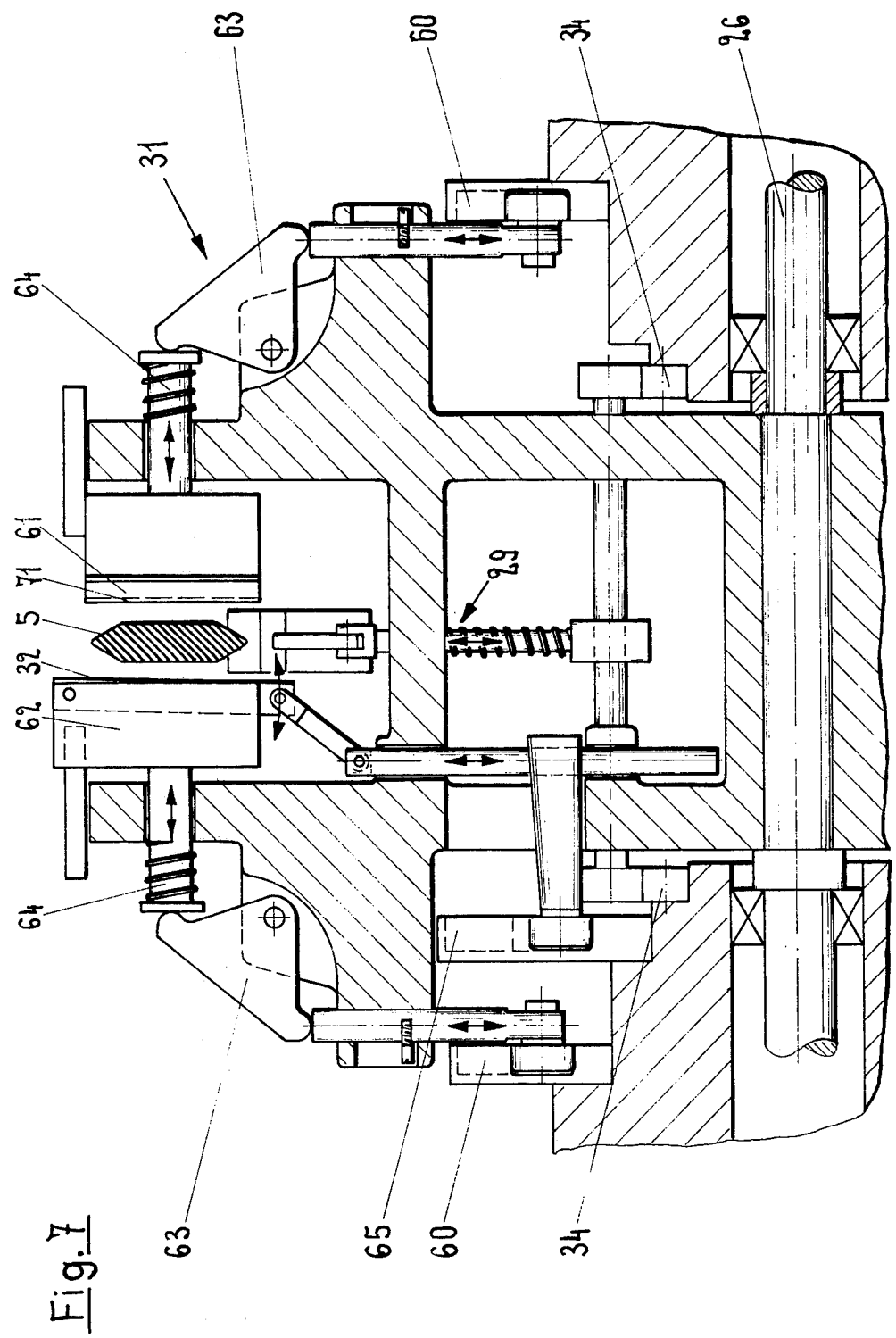

FIG. 6 is a cross-section on the line VI-VI of FIG. 4, of a tube which has been pre-shaped on its inner wall turntable of FIG. 1 but which has not been transversely welded or separated into single packages; and FIG. 7 shows in section an enlarged view of a transverse welding station with a cutting apparatus. FIG. 1 shows a substantially complete plant, some parts of which are illustrated diagrammatically. As a whole, the machine is carried on a frame 1 which has a more or less central upright stand 2 on which are mounted upper direction-changing rollers 12, a filler station 3 and a butt welding station 4 for producing the longitudinal seam in a tube 5 formed from a web 8. Notably mounted on a shaft 6 shown on the left is a roll 7 of the web material 8. From this roll, the material passes over direction-changing rollers 9 and 10 upwardly in the direction of the arrow 11. It is directed by the diagonally disposed roller 12 and, as it passes rollers 13 and 14, it is guided downwardly and to the right, in the direction of a first turntable 15. The web 8 is, after it has left the roller 14, so folded over by known folding arrangments, not shown in the drawings, that a crease is produced along the center line 16 in such a way that the free ends or edges 17 and 18 of the web are disposed opposite each other, as shown in the region immediately beneath the filling station 3. The web 8 has also been precreased by conventional folding arrangements along transverse and diagonal lines, such as line 70 as indicated in FIG. 4, so that the packages have all the necessary fold lines corresponding to the final folds in the packages to be made, and are thus readily formed into final shape.

At this point, the tube 5 is still open so that a filler pipe 19 from station 3 can be inserted into the tube 5. From a point above the butt welding station 4, the filler pipe extends down into a lower part 20 of the tube 5. The level 21 of liquid 22 is shown in the lower part 20. The butt welding station 4 has a tank 23 to hold granular plastics materials and a known type of extruder 24 which injects liquid synthetic platies material between the free edges 17 and 18 of the web of material and between the rollers 25 and 25' disposed immediately downstream of the butt welding station, with the roller 25' behind the roller 25, as viewed in FIG. 1. The rollers 25 and 25' between which the edges of the web pass, are hollow liquid cooled oppositely driven rollers having parallel axes of rotation, and are provided with inlet and discharge pipes for cooling liquid. These rollers help to shape the butt welded seam of plastics material, preferably into a smooth transverse profile, which is at the same time cooled. In the lower part 20 of the tube 5, the butt welded seam has become so solidified that the liquid 22 can be safely introduced into the tube.

The axes of rotation 26 and 27 of the first turntable 15 and a second turntable 28 are disposed at right-angles to the projection of the direction of movement of the tube 5. The first turntable 15 has eighteen gripper or shaping devices 29 (not all of which are shown) which will be described in greater detail hereinafter. At the location identified by the arrow 30, a transverse welding station 31 which is described in greater detail with reference to FIG. 7, and cutters 32, fulfil their activities. From the overall view in FIG. 1, it is possible also to see a fixed cam plate 33 on the axis of the first turntable 15, a control surface 34 of which is followed by the gripper devices 29. The first turntable 15 is driven in the direction of the arrow 36.

The second turntable 28 is driven in the opposite direction, as indicated by the arrow 37. It has on its periphery shaping dies 38 which have no moving parts. After the packages 41 have been cut into separate units, they are pressed onto shaping dies 38, shaping dies 38 receive the heretofore outer side wall and pressingly fold and shape them. Shaping dies 38 first engage packages 41 tangentially and then press inwardly upon the outer side walls thereof during the meshing interengagement of packages 41 and shaping dies 38 while packages 41 are also still retained on grippers 29. The length of shaping dies 38 is equal to the height of packages 41. Alongside the turntable 28 is a discharge station 40 which is illustrated in greater detail in FIGS. 2 and 3.

Figure 2:
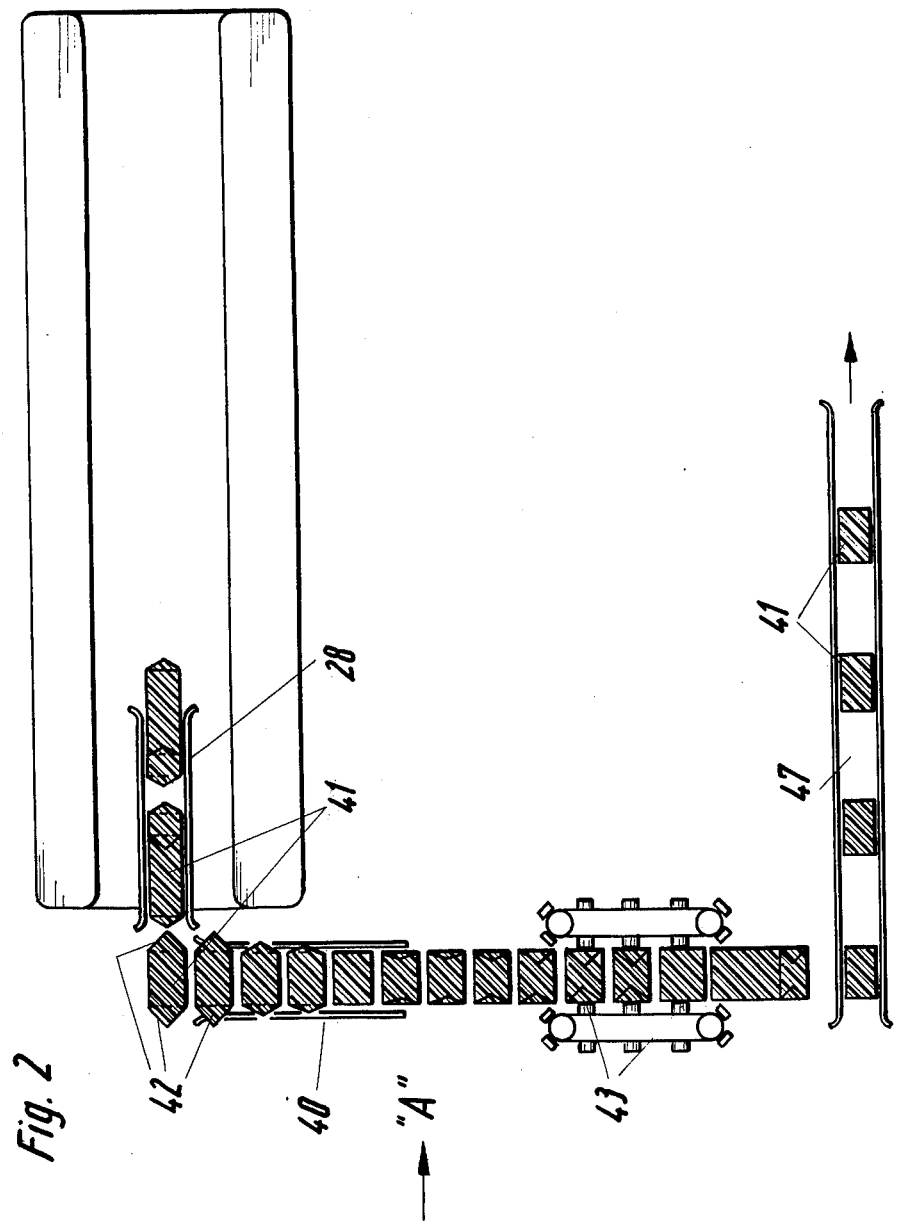
FIG. 2 is a plan diagrammatic view of a discharge device to be located adjacent and at right-angles to the second turntable shown in FIG. 1.
Figure 3:
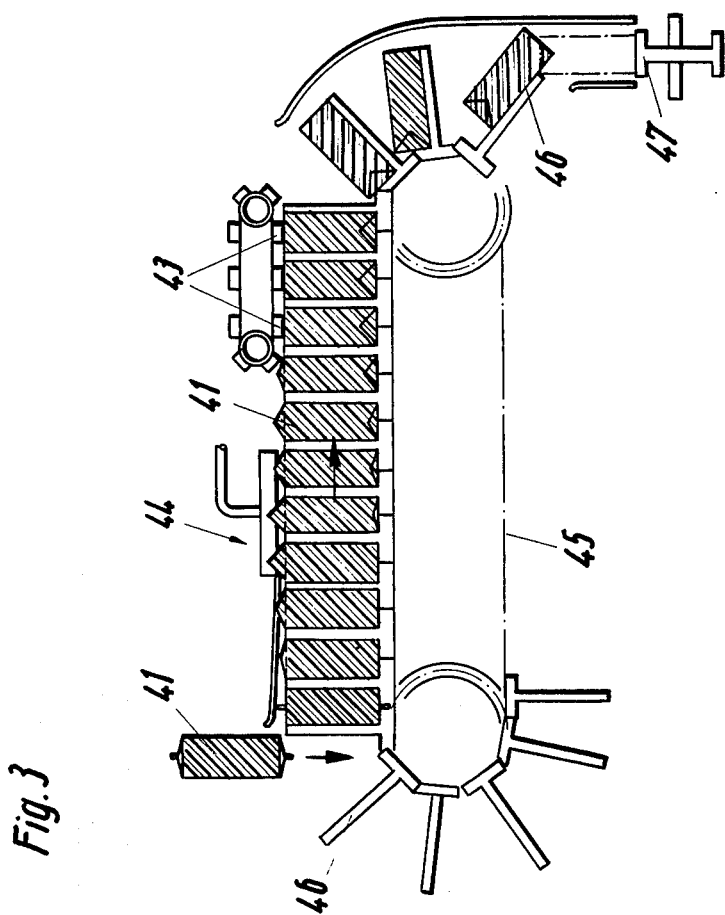
FIG. 3 is a diagrammatic view of the discharge station of FIG. 2, in the direction of the arrow "A" of that Figure.

FIG. 2 shows the second turntable 28, which is only diagrammatically indicated. Shown in this Figure are individual packages 41 discharged from the second turntable and the tongues 42 of which still project, ready to be folded down and glued onto the upper or lower ends of the packages by pressure jaws 43, shown in FIG. 3, after prior heating by a heating apparatus 44. A conveyor 45 (FIG. 3) driven at a suitable speed, picks up packages 41 falling off the second turntable 28 where shown on the extreme left in FIG. 3, and pusher blades 46 on the conveyor guide the packages under the heating apparatus and the pressure applying jaws, after which they are carried away and deposited by the blades 46, on a final conveyor 47.

One form of gripper or shaping device 29 is now described with reference to FIG. 1. The devices 29 have push members 50 which are subject to the action of compression springs 51, and carry on their inside ends rollers 52 engaging the cam plate 33. At their outer ends the members 50 carry articulated, positively controlled, gripper jaws 53.

Another form of gripper devices 29 is shown in FIG. 4. In this case the push members 50 have, rotatably hinged at their outer ends, U-shaped shaping members 55, of which the two arms 57 and 58 are shorter than the web 56 which connects them, the leading arm 58 which first engages the tube 5 being longer than the trailing arm 57.

FIG. 7 shows a cross-section through a transverse welding station 31 which co-rotates on the axis 26 within the first turntable. As mentioned above, a transverse welding station 31 is associated with each gripper device 29. The drawing shows how the mechanical transmission of the control of the gripper devices 29 from the control cams 34 shown on the right and left in FIG. 7 occurs. The devices 29 are connected to cross members which follow these cams. Furthermore, farther out and likewise on the right and left in FIG. 7, are cams 60 for controlling the sealing jaws 61 or mating jaws 62. Mechanical coupling between these cams and the jaws is effected through pivoting parts 63 and springbiased pistons 64. The cams 60 are so shaped that the jaws operate at the appropriate rotational positions of the gripper devices, i.e., at position 30 of FIG. 1. A further cam 65 is shown in the left-hand half of FIG. 7 and operates a cutter 32 via a linkage. At the top, in the centre, between the sealing jaws 61 or mating jaws 62, is shown a partially pre-shaped tube 5.

The apparatus described above operates in the following way:

When filled with liquid 22, the tube 5 is pulled by the drive of the first turntable 15 in the direction of the arrow 36 tangentially onto the periphery of the first turntable. In the case of the embodiment of gripper devices shown in FIG. 1, gripper tongues 53 engage the tube on both sides of the transverse fold lines of the respective packages on the right and left of what will subsequently be the cutting line, in such a way that the packages are folded in on the inside of the circle, i.e., along their inner side walls, with a shortening of the length of the inside radius of tube 5. It will be seen by inspecting the cam plate 33, i.e., the control cam 34, that the gripper jaws remain in this closed position through a rotation of approximately 180°. The packages are now so pulled around in the direction of the arrow 36 that they remain stretched on their outer periphery. The angles and the curvatures are so adjusted that troublefree conveyance in the direction of the circular line can take place.

According to the form of embodiment shown in FIG. 4, the webs 56 of the members 55 engage the inner side walls of the package between the transverse fold lines of the respective packages 41 so that here, too, there is a corresponding folding along the envisaged fold lines 70. Because of the existence of the fold lines or creases, shown in FIG. 4, the grippers 29 press radially outward into the tube 5 to produce a flat surface over the length of the web 56, or the height of the package.

Figure 5:
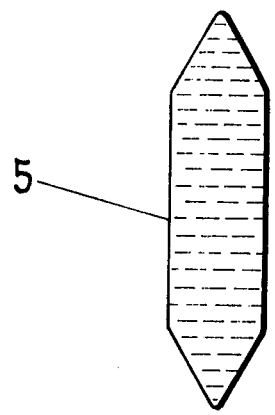
FIG. 5 is a cross-section on the line V-V of FIG. 4.

FIG. 5 shows a cross-section through the longitudinally welded filled and not yet shaped packages or tube 5. This cross-section, which is shaped like an oblong with V-shaped ends, occurs between filling the tube and its engagement with the first turntable. When, according to FIG. 4, the chainwise adjacently disposed packages have been conveyed on through approximately 90° in the direction of the arrow 36, the tube 5 now has the cross-sectional shape as illustrated in FIG. 6. By action of the grippers 29, as illustrated in both FIG. 1 and FIG. 4, the radially inward end or bottom V of the section shown in FIG. 5 is passed upwardly into a flat shape so that the area between the transverse fold lines at each end of a respective package is a flat surface having the cross-sectional shape shown in FIG. 6, with the unflattened portion at the location of the end fold lines remaining in the V-shape to form the tag or flap 42.

As better viewed in FIG. 4, the partly shaped package at the location of the line VI—VI has the appearance of an isosceles trapezoid with the radially outward base line retaining its original length, whereas the inward base line has been shortened by the action of the web 56 in collapsing the inward V-shaped section and folding on the diagonal creased lines 70. This action is facilitated by the compression in the circumferential direction resulting from the reduced length of the inward surfaces at the shorter radius. This compression also intensifies the grip of the tags 42 on the arms 57 and 58 of the member 55. The abutting tags 42 of contiguous packages are engaged and held between the members 55 on either side of the eventual transverse sealing and cutting line.

These tags, as described above may be folded and struck down afterwards.

At the location 30 shown in FIG. 1, the transverse welding station 31 comes into operation, i.e., the sealing jaw 61 moves under control of cams 60 against a mating jaw 62 which likewise moves towards the centre and transversely welds the liquid-filled tube to define packages. Shortly afterwards, under the control of cams 65, cutters 32 and a co-operating slot 71 opposite cutters 32 come into operation and the packages 41 are thereby separated into single units. During this time, the first turntable 15 has rotated farther on in the direction of the arrow 36. After approximately 180°, of rotation, the grip of the gripper jaws 53 is released, or as the case may be the members 55 move out of the folding position radially inwardly. As a result, the separate packages are free to be passed onto the second turntable 28. However, sufficient force is still applied so that the outer side walls of the packages on the first turntable 15 are pressed against the shaping dies 38 on the second turntable 28. In consequence, the originally outer side walls of the package become formed into a flat surface similar to the shape of the bottom portion of FIG. 6. As previously mentioned, the length of the dies 38 in the circumferential direction is equal to the height of the package. The dies 38 are thus more or less wedged in between the tags formed at each end of the respective packages. The second turntable rotates in the direction of the arrow 37 and conveys the now formed individual packages 41 to the discharge station 40. As a consequence of the wedging of the dies 38 between the end tags of the packages 41 and the assistance of gravity as the packages pass over the top of the second turntable 28, there is no danger of the packages falling off the dies or being prematurely released. Also, as shown in FIG. 2, the turntable 28 may be provided with lateral guide members to prevent the packages from falling sidewise off the turntable. Revolving pressure-applying jaws 43 finally shape the packages and fasten the still-projecting tags on flaps, as yet not folded over by conventional guide means, by adhesion onto the upper or under sides of the package 41. The conveyor 47 then carries away the completed and filled packages 41.

The invention is particularly applicable to packaging milk, although other liquids can be packaged.

We claim:

1. A method of making liquid filled packages wherein a web of material which is impervious to liquid on at least one side is folded and longitudinally welded to form a continuous tube having precreased therein all fold lines necessary for forming the packages, and the tube is filled with the liquid, including the steps of passing the filled tube continuously through a first part circular path while partly shaping the tube into longitudinally joined individual packages and shaping first side walls of the packages, said first side walls being on the radially inner side of said circular path of the tube, transversely welding the tube and separating the tube into individual partly shaped packages as the tube moves in said first part circular path and passing the packages through a second part circular path of opposite curvature to said first path, said partly shaped packages being folded and shaped to define second side walls opposite to said first side walls while passing through said second path.

2. The method of claim 1 wherein said first and second side walls are the narrower of four side walls of the packages.

3. The method of claim 1 wherein, after such shaping to define the first and second side walls, the packages are passed between rotating pressure rollers to be finally shaped.

4. The method of claim 1 wherein the longitudinal welding of the folded web of material is effected by butt welding of the free edges using synthetic plastics material which is introduced in liquid form.

5. Apparatus for making liquid filled packages, including a welding station for longitudinally welding the edges of a folded web of material to form a tube, a filler pipe to extend into a lower part of the tube, a continuously rotatable first turntable, grippers rotatable with the first turntable to grip the tube at intervals along its length to partly shape the tube into longitudinally joined individual packages and including shaping the tube to define first, radially inward, side walls of the packages, means for transversely welding the tube and separating the tube into individual partly shaped packages as the tube rotates with the first turntable, and a second turntable continuously rotatable in the opposite sense from the first turntable, the second turntable being adjacent the first turntable to receive said partly shaped packages in a continuous curved path therefrom and to fold and shape the packages to define second side walls opposite said first side walls.

6. The apparatus of claim 5 and further comprising means operable to engage the grippers with the tube over about 250° of rotation of said first turntable.

7. The apparatus of claim 5 and further comprising a transverse welding means associated with each gripper.

8. Apparatus according to claim 7 and so arranged that said transverse welding means operate after the tube has passed through about 125° on the first turntable.

9. Apparatus according to claim 5 wherein said transverse welding means include camoperated sealing jaws and a cutting device.

10. The apparatus of claim 5 including respective axes of rotation to said first and second turntables, said axes being parallel each to the other and at right-angles to the direction of the movement of the tube.

11. Apparatus according to claim 5 wherein a stationary cam disposed on the axis of rotation of the first turntable has a control surface to be followed by radially movable push members connected to operate said grippers.

12. Apparatus according to claim 5 wherein each gripper has a rotatably mounted member of U-shaped cross-section, the web of the U-shaped member being longer than the arms, and being of a length equal to the height of the folded packages.

13. The apparatus of claim 5 wherein each said gripper device comprises an arm and positively controlled gripper jaws hinged thereto.

14. The apparatus of claim 5 and further comprising shaping dies defining a polygonal periphery to said second turntable, the length of said shaping dies in the direction of rotation of said second turntable being equal to the height of the folded packages.

15. The apparatus of claim 5 and further comprising, in said welding station, two oppositely driven cooled rollers having parallel axes of rotation and between which the edges of the web may pass, an extruder, and an outlet orifice to said extruder disposed to open in the direction of movement in the web and upstream of said rollers.

16. The apparatus of claim 15 and further comprising hollow interiors to said rollers and inlet and discharge pipes to said interior for cooling liquid.

17. Apparatus according to claim 15 wherein, in use, the material, when folded into the form of a tube, engages over a roller as it passes said welding station.

18. The apparatus of claim 5 and further comprising rotatable pressure rollers to finally shape packages passed from said second turntable.

19. Apparatus according to claim 5 including direction changing rollers for said web of material.

* * * * *